United States Patent [19]

Shu et al.

[11] Patent Number: 5,802,212

[45] Date of Patent: Sep. 1, 1998

[54] CLUSTERED-DOT DITHER WITH WHITE-FLECK SUPPRESSION

[75] Inventors: Joseph Shu; Chia-Hsin Li, both of San Jose, Calif.

[73] Assignee: Seiko Epson Corporation, Tokyo, Japan

[21] Appl. No.: 607,073

[22] Filed: Feb. 26, 1996

[51] Int. Cl.⁶ ............................................. H04N 1/40
[52] U.S. Cl. .................................. 382/237; 382/270
[58] Field of Search ........................ 382/237, 251–253, 382/270, 272–273; 395/109

[56] References Cited

U.S. PATENT DOCUMENTS

| | | | |
|---|---|---|---|
| 4,547,812 | 10/1985 | Waller et al. | 358/283 |
| 4,783,837 | 11/1988 | Kawamura et al. | 382/50 |
| 4,783,840 | 11/1988 | Song | 382/54 |
| 4,901,063 | 2/1990 | Kimura et al. | 340/723 |
| 5,023,919 | 6/1991 | Wataya | 382/54 |
| 5,073,959 | 12/1991 | Sugiura et al. | 382/22 |
| 5,193,122 | 3/1993 | Kowalski et al. | 382/9 |
| 5,231,677 | 7/1993 | Mita et al. | 382/22 |
| 5,271,064 | 12/1993 | Dhawan et al. | 382/54 |
| 5,351,305 | 9/1994 | Wood et al. | 382/6 |
| 5,381,490 | 1/1995 | Shin | 382/54 |
| 5,394,252 | 2/1995 | Holladay et al. | 358/533 |
| 5,438,437 | 8/1995 | Mizoguchi et al. | 358/518 |
| 5,467,422 | 11/1995 | Itihara et al. | 358/298 |
| 5,473,440 | 12/1995 | Haneda et al. | 358/300 |
| 5,579,457 | 11/1996 | Hall | 395/132 |

OTHER PUBLICATIONS

The Seybold Report on Desktop Publishing; "Dispersed-Dot Ordered Dither"; Dec. 5, 1990.

Primary Examiner—David K. Moore
Assistant Examiner—Stephen Brinich
Attorney, Agent, or Firm—Eric B. Janofsky

[57] ABSTRACT

In a computer system (10) that employs an ink-jet printer (12), a printer driver (36) receives signals from an applications program (34) that describes an image in multiple-bit pixel values. The driver converts the multiple-bit-per-pixel representation into the binary-pixel-value format necessary to operate the printer. In so doing, it submits the image values I(x,y) to complementary weighting processes (136 and 138). It then applies clustered-dot dithering to one of the weighting-process outputs and distributed-dot dithering to the other weighting-process output, and it commands the printer to apply ink at any pixel for which the output of either dithering step calls for it. Except at the highest pixel values, the weighting is such that the overall output is the same as that which clustered-dot dithering produces. At the highest pixel values, the results tend increasingly toward those of dispersed-dot dithering as the input value in-creases. The result is the avoidance of the white flecks that would otherwise afflict the darkest areas, particularly when printing is performed on media that require ink-duty-cycle limiting.

32 Claims, 6 Drawing Sheets

CLUSTERED-DOT DITHER WITH WHITE-FLECK SUPPRESSION

RELATED APPLICATIONS

Applicants hereby incorporate by reference the following U.S. Patent applications contemporaneously filed and commonly assigned herewith:

U.S. patent application Ser. No. 08/607,074 of Joseph Shu and Chia-Hsin Li for GENERATING COLOR-CORRECTION LOOK-UP-TABLE ADDRESSES BY MULTI-LEVEL HALF-TONING, Assignee's Docket No. AP016;

U.S. patent application Ser. No. 08/607,071 of Chia-Hsin Li and Joseph Shu for BANDING NOISE REDUCTION FOR CLUSTERED-DOT DITHER, Assignee's Docket No. AP019;

U.S. patent application Ser. No. 08/607,075 of Joseph Shu and Chia-Hsin Li for DISPERSED-DOT DITHER WITH IMPROVED LIGHT-COLOR SMOOTHNESS, Assignees Docket No. AP020.

BACKGROUND OF THE INVENTION

The present invention relates to digital display devices such as printers and computer systems that use them. It particularly concerns improving such devices' tonal rendition.

At some point or another in the digital processing of an image, the image takes the form of picture-element ("pixel") values, i.e. image values at discrete locations in the image. Being expressed digitally, those values are necessarily quantized, but they often are nonetheless expressed with a considerable degree of value resolution. The shade of gray in a "black and white" image, for instance, may be expressed with, say, eight bits or more of resolution, so the pixel may take on any one of 256 or more values. A color-image pixel value is typically a three-dimensional vector quantity. If each vector component is expressed with eight bits of resolution, a spectrum of over 16 million colors results.

On the other hand, most computer-driven printing devices, such as laser, dot-matrix, and ink-jet printers, operate in a binary fashion: the output medium is divided into a number of pixels, and the printing device can only print a dot at the pixel location or leave it blank: there ordinarily is no dot-size or intensity choice. In the case of monochrome printers, all of the dots are printed in a single color. In a color printer, the same dot can be printed with various combinations of the printer's basic color components (e.g. cyan, magenta, and yellow), but, again, each color component has only two values: printed or not.

To render the underlying, high-value-resolution image with such a low-value-resolution device, the high-value-resolution image must be converted into a binary-valued image pattern that the human visual system will tend to integrate to create an illusion of the higher-value-resolution source image. The half-toning process employed in printing for generations performs such a conversion.

A widely employed approach to performing half-toning digitally is called "ordered dithering," predetermined and generally different threshold values in a "dither array" are associated with respective image pixels: the dither array conceptually overlies the image pixel array. If the dither array is smaller than the image array, the dither array is replicated and "tiles" the image array to produce a repetitive pattern.

Each pixel thus has two values conceptually associated with it, namely, the requested pixel tonal value and the corresponding dither-array element. These two values' comparison yields that pixel's value in the output, binary-valued image.

Many dither-array patterns have been proposed and used, each having its own advantages and disadvantages. As an original proposition, the type commonly referred to as "dispersed-dot" dithering tends to recommend itself. The salient feature of this type of dithering is that large and small threshold values are spread throughout the array as evenly as possible. Such arrays tend to achieve relatively good high-spatial-frequency fidelity, and they are also recognized as being capable of relatively fine apparent-value resolution.

But there is a wide range of applications for which users prefer a clustered-dot-dither array, in which higher values tend to be clustered near other higher values, and lower values tend to be clustered, too. A uniform gray level tends to be rendered in the binary image as clusters of printed pixels, the cluster size depending on the underlying gray value. The resultant image is visually similar to those that the traditional half-tone photoengraving screen produces. Although clustered-dot dithering tends not to afford the same apparent-gray-scale resolution and spatial-frequency fidelity of which dispersed-dot dithering is capable, clustered-dot dithering is more forgiving of certain display devices' inability to display isolated pixels. In other words, a major advantage of clustered-dot dithering is its ability to accommodate limitations inherent in the chosen printing hardware.

SUMMARY OF THE INVENTION

We have found a way of modifying conventional cluster-dot dithering that extends its ability to accommodate certain printers' limitations. Specifically, our approach tends to eliminate the white flecks that ink-jet printers availing themselves of clustered-dot dithering's other advantages would otherwise need to leave, particularly when they comply with ink-duty-cycle limitations.

On certain print media the ink duty cycle must be limited in order to avoid bleeding. Ordinarily, a system that avails itself of the other advantages of clustered-dot dithering would be forced to leave white flecks in extended dark regions in order to observe duty-cycle limitations. Our modified approach in effect transfers isolated printed dots from solidly printed regions into what would otherwise be white flecks. It thereby eliminates this undesired artifact.

We employ a conventional clustered-dot dithering matrix for all input values below a certain point in the input-value range. But if the input value is above that point, we perform a process that can be thought of as a weighted combination of clustered-dot dithering and dispersed-dot dithering or some other non-clustered-dot type of half-toning. As the input value increases, the latter is weighted more and the former is weighted less. More specifically, rather than simply comparing each clustered-dot-matrix threshold with the corresponding input value, we compare that threshold with a percentage of the input value, and the percentage decreases as the input value increases. Concurrently, we perform some non-clustered-dot type of half-toning on an increasing percentage of the input value; typically, we compare it with the corresponding threshold from a dispersed-dot dithering matrix. If either fraction of the input value exceeds the corresponding matrix value, the pixel is "turned on."

Preferably, the percentage of the input value compared with the cluster-dot-matrix value reaches zero at the top of the input-value range, while the input percentage compared with the corresponding dispersed-dot-dither-matrix value reaches 100%.

BRIEF DESCRIPTION OF THE DRAWINGS

The following discussion of the invention refers to the accompanying drawings, of which.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included within a printer that receives instructions in terms of high-resolution nominal colors or gray scales, and the dedicated circuitry can be designed to convert the requested values to the on-and-off or other low-value-resolution instructions required to render the requested image. But the invention will more typically be implemented by a general-purpose machine, such as a personal computer operating as a printer driver, whose purpose is to convert an image expressed in nominal color values into display-device commands that specify the low-level, typically on-or-off operation of a printer that the computer controls.

Figure 1:
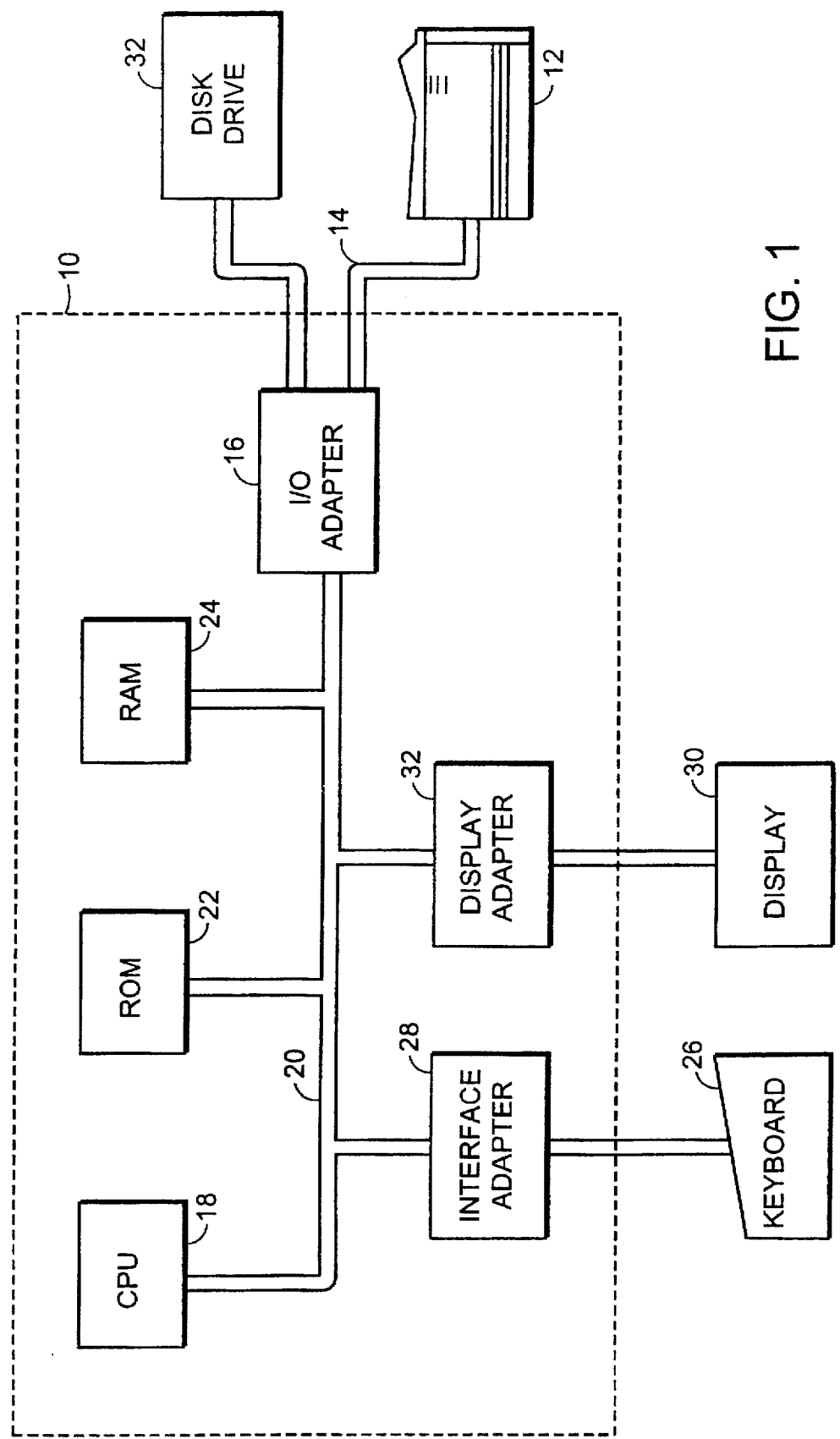
FIG. 1 is a hardware-perspective block diagram of a computer system employing the present invention's teachings.

FIG. 1 depicts a typical hardware environment. A personal computer 10 sends a display device such as an ink-jet printer 12 low-level instructions, i.e., instructions that specify which individual display-medium pixels should receive ink dots. The drawing depicts the printer 12 as receiving these instructions by way of an appropriate channel 14. Computers that are capable of practicing the present invention come in a wide variety of configurations, and FIG. 1 depicts one in which channel 14 is provided by an input-output adapter 16 with which a central processing unit 18 communicates by way of an internal bus 20.

Of course, the central processing unit 18 will typically fetch data and instructions at various times from a variety of sources, such as solid-state read-only and read-write memories 22 and 24. FIG. 1 also depicts the computer 10 as communicating, as is typical, with a keyboard 26 by way of an interface adapter 28.

The present invention particularly concerns display devices within this environment. In this connection FIG. 1 depicts the central processing unit 18 as being coupled to a cathode-ray-tube display 30 by a display adapter 32. The computer 10 can employ the present invention's teachings not only to drive printer 12 but also to form an image on the cathode-ray-tube display 30; the broader aspects of the invention are applicable to any pixel-organized display device.

But its use on display devices of the cathode-ray-tube type will be infrequent, because present-day cathode-ray-tube computer monitors such as display 30 are capable of greater value resolution than the simple on-or-off values of which most printers are capable. Although dithering can be practiced in a conversion from a high value resolution to any lower value resolution, not merely to binary representations only, the value resolution of which most monitors are currently capable is usually considered adequate, and dithering is not considered necessary. And whereas the artifacts to whose avoidance the present invention is directed are of particular concern when limits are placed on the display agent's duty cycle, ink bleeding, which is what duty-cycle limitations are usually imposed to avoid, does not afflict computer monitors. Nonetheless, the present invention's teachings are not limited to ink-jet or other printers, but instead are applicable to digital pixel-oriented display devices generally.

In the typical situation, the computer 10 implements the present invention's teachings when it is acting as a printer driver. The instructions that configure the computer to perform this function are usually included in the operating-system software transferred to the computer's disc drive 32 and stored in a disc that the drive contains. Often, the driver software will have been loaded into the computer system from a diskette or CD-ROM. In any event, the computer 10 reads the printer-driver instructions from the disc drive in most cases and then performs the below-described functions to implement the present invention's teachings.

Figure 2:
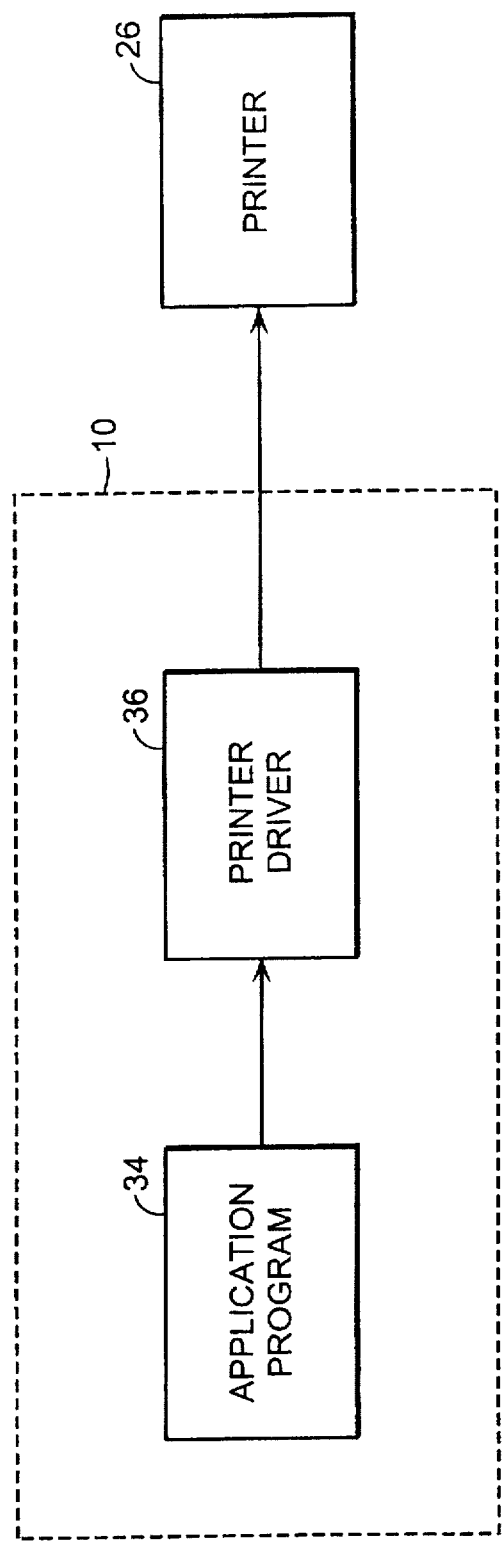
FIG. 2 is a software-perspective block diagram of the same computer system.

FIG. 2 depicts the typical situation from more of a software standpoint. Typically, the present invention's teachings will come into play when the computer 10 is operating a user's application program 34 and that program makes a system call requesting that an image be printed. The requested operation is carried out by a printer driver, which is usually considered to be part of the operating system but is specific to the designated printer. The printer driver's purpose is to convert a device-independent representation of the image into low-level printer instructions that will render that image as faithfully as the printer's limitations permit.

Figure 3:
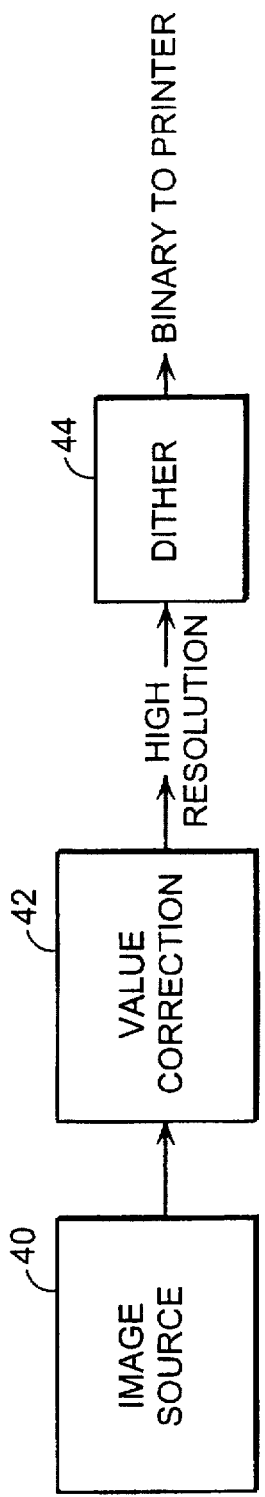
FIG. 3 is a high-level block diagram of part of the printer driver of FIG. 2.

FIG. 3 represents the computer, in performing the user process, as an image source 40 whose output is the rasterized image. For the sake of example, let us assume that the pixels are expressed as three-component vectors, respective components being expressed in eight-bit red, green, and blue values. These pixel values are nominal, ideal values that the application program is requesting be rendered as faithfully as possible, and the commands that will achieve that result for a given color depend to a considerable extent on the particular printer, inks, and medium. So a processing step 42 specific to the printer and other variables is usually performed to "correct" the image data to values that will cause printer to produce a more-faithful rendition than would result from simply giving the nominal values.

This processing, part of which is typically implemented by a look-up table—possibly with some interpolation—not only implements color correction but may also have certain other purposes. One of these, ink-duty-cycle limitation, is of particular interest in the present context. Certain media are susceptible to bleeding if ink is applied with as high a duty cycle as a request for a particularly dark area would tend to produce. So the processing step 42 may additionally so limit its output values as to prevent the undesired high ink duty cycles. In the absence of the present invention, a subsequent dither step 44, which converts the eight-bit-component inputs into single-bit-component outputs, would cause the printer to leave undesirable white flecks in region intended to be uniformly dark. (For the remainder of the discussion, we will concentrate on the processing of only a single one of the color components, because all components' processing is the same.)

Figure 4:
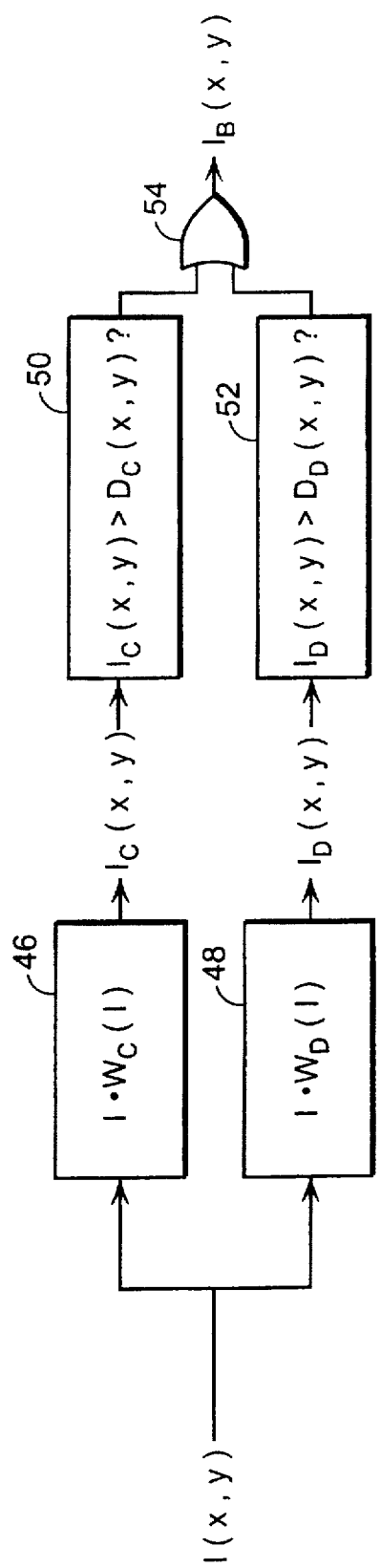
FIG. 4 is a functional block diagram of the dithering process that the present invention employs.

FIG. 4 illustrates how the present invention avoids this result. FIG. 4 represents the input to the dither step 44 as $I(x,y)$. A normal dither function would be to compare $I(x,y)$ with a corresponding element $D_C(x,y)$ of the dither matrix. (For ease of discussion, we will treat the dithering as employing a matrix equal in size to the entire image. As a practical matter, the stored dither matrix would be much smaller, and the conceptual dither matrix we employ here is the result of "tiling" the entire image with the actual stored dither matrix.) The output, binary image $I_B$ then is simply the result of the comparison.

But according to the present invention, the input component I is weighted in step 46 by a weighting function $W_C(I)$. This function has a form that will be described presently by reference to FIG. 5. A parallel weighting step 48 weights the input I by another weighting function $W_D(I)$ to produce two weighted values $I_C(x,y)$ and $I_D(x,y)$.

Figure 5:
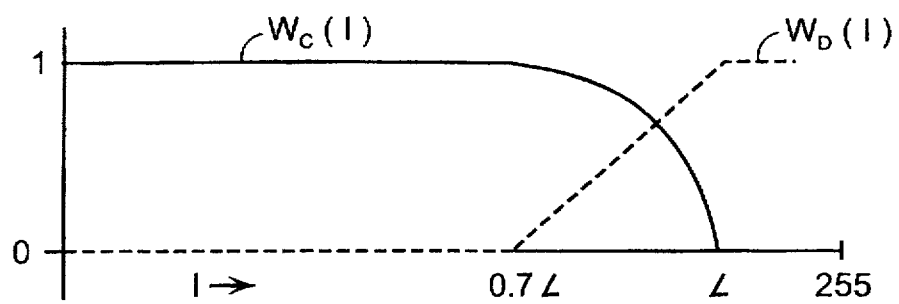
FIG. 5 is a plot of the weighting functions that one embodiment of the present invention employs.

As FIG. 5 shows, $W_C(I)$ and $W_D(I)$ respectively have unity and zero values for most values of I. But when the pixel value I reaches, say, 70% of the ink-duty-cycle limit L for the particular currently employed medium, $W_C(I)$ begins to take on non-zero values, and $W_C(I)$ begins to decrease. (So what we refer to here as "weighting" is, as a practical matter, simply a straight preservation of the input value without a weighting multiplication for most pixel values I.)

The two weighted pixel values $I_C$ and $I_D$ are then applied to corresponding dither operations 50 and 52. Operation 50 is a dither operation employing a conventional clustered-dot dither matrix $D_C(x,y)$, while operation 52 is a conventional dither operation employing a distributed-dot dither matrix $D_D(x,y)$. The binary output pixel values $I_B(x,y)$ are simply the ORed results of those dither operations, as an OR-gate symbol 54 indicates.

One concludes from FIG. 5 that this approach's results are exactly the same as conventional clustered-dot-dithering results in all regions whose intensities are below 0.7 L. But when the pixel values exceed this fraction of the ink-duty-cycle limit, isolated pixels are turned off within what would otherwise be solid clusters, and pixels are turned on in their stead in what would otherwise be the undesired white flecks. This effect increases up to, in the illustrated example, the ink-duty-cycle limit L, at which point the turned-on pixels have been totally redistributed in accordance with a distributed-dot dithering pattern.

So in those regions in which the image source 40 has requested dark regions that would be solidly printed in the absence of the ink-duty-cycle limit, the illustrated embodiment achieves a uniform approximation to the requested effect, whereas a conventional clustered-dot approach would not.

Although it should be clear that many different pairs of weighting functions can be used to implement the present invention, we prefer to practice the present invention by employing weighting functions having certain features that we will now describe.

As was stated above, we have assumed for the sake of example that each pixel-value component is expressed in eight bits, so a pixel-value component has a value between 0 and 255. But as FIG. 5 suggests, the actual range of the input data I extends only to a value L less than 255. This results from a limitation that FIG. 3's step 42 imposes on the ink duty cycle. It is best for the cluster weighting function $W_C$ to reach a value of zero by this limit. Complementarily, the dispersed-dot-dither weighting function $W_D$ should preferably reach a value of unity by that limit.

Now, FIG. 5 depicts $W_D$ as being piecewise-linear, whereas $W_C$ has a curved region. This is not a necessary or necessarily preferable feature in an implementation of the present invention. However, we have found it convenient because, for the relative sizes of the actual dither matrices that we have used, that feature makes it easy to achieve a relationship that avoids reducing the ink duty cycle any more than necessary.

Specifically, the overall ink duty cycle that results from the weighted combination of the two dithering types should equal the duty cycle that would have resulted if the conventional, unweighted clustered-dot dithering had been performed alone. To achieve this result, we first somewhat arbitrarily pick the piecewise-linear dispersed-dot-dither weighting function $W_D$ illustrated in FIG. 5. We then determine the corresponding values of $W_C$ by employing the procedure that FIG. 6 depicts.

Now, one might at first ask why $W_C$ could not simply be made complementarily linear: since the number of pixels "turned on" by a dither matrix is a substantially linear function of the input value, it seems that the turned-on-pixel decrease caused by linearly reducing the clustered-dot weighting would essentially match the turned-on-pixel increase that a complementarily linear dispersed-dot weighting would cause. Indeed, this is the result if one considers the outputs of FIG. 4's processes 50 and 52 only separately. But processes 50 and 52 would turn on some of the same pixels, so the total actually turned on is less than the sum of the two processes' individual results.

Figure 6A:
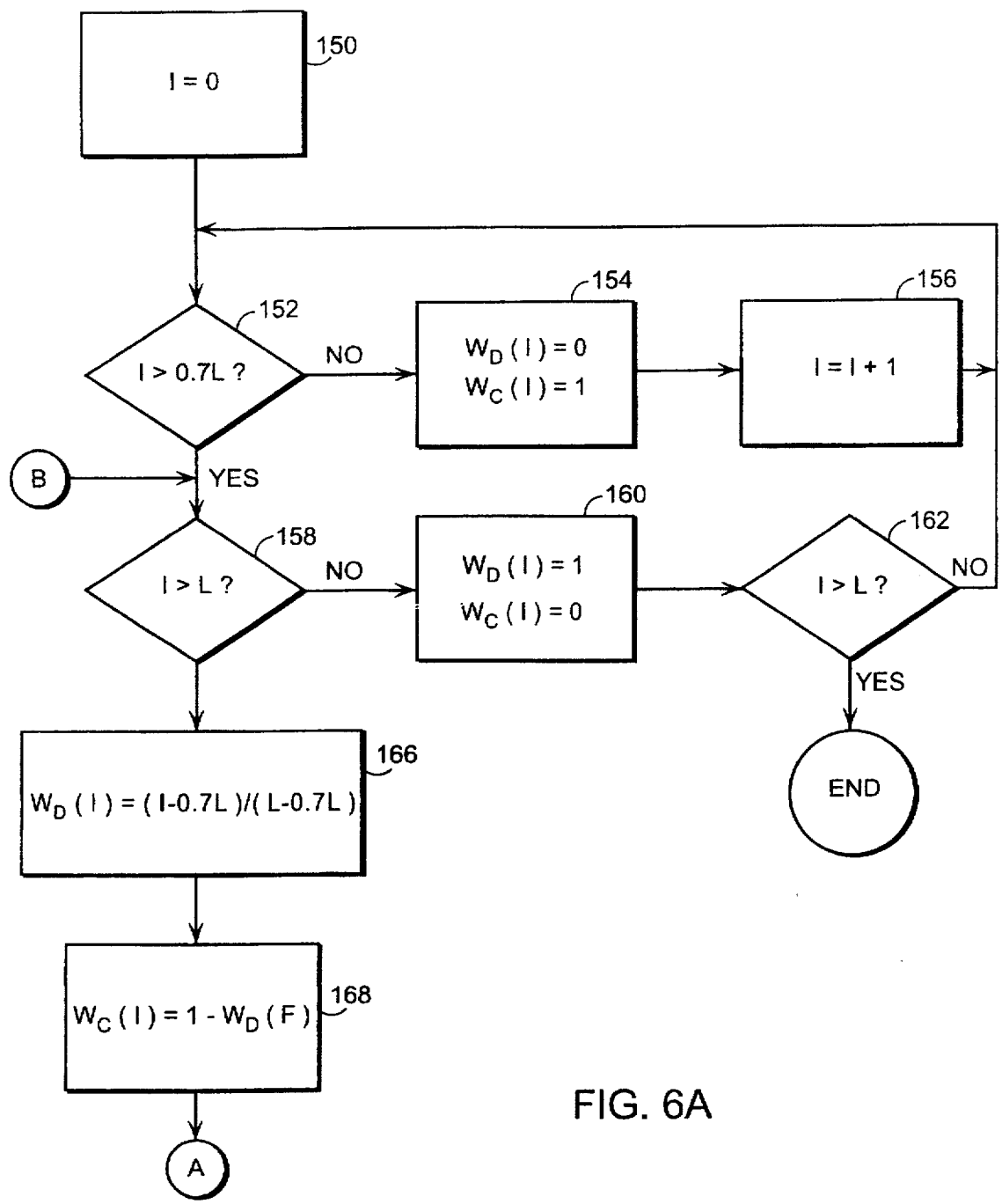
FIGS. 6A and 6B together form a flow chart that describes the method employed to arrive at one of the weighting functions of FIG. 5.
Figure 6B:
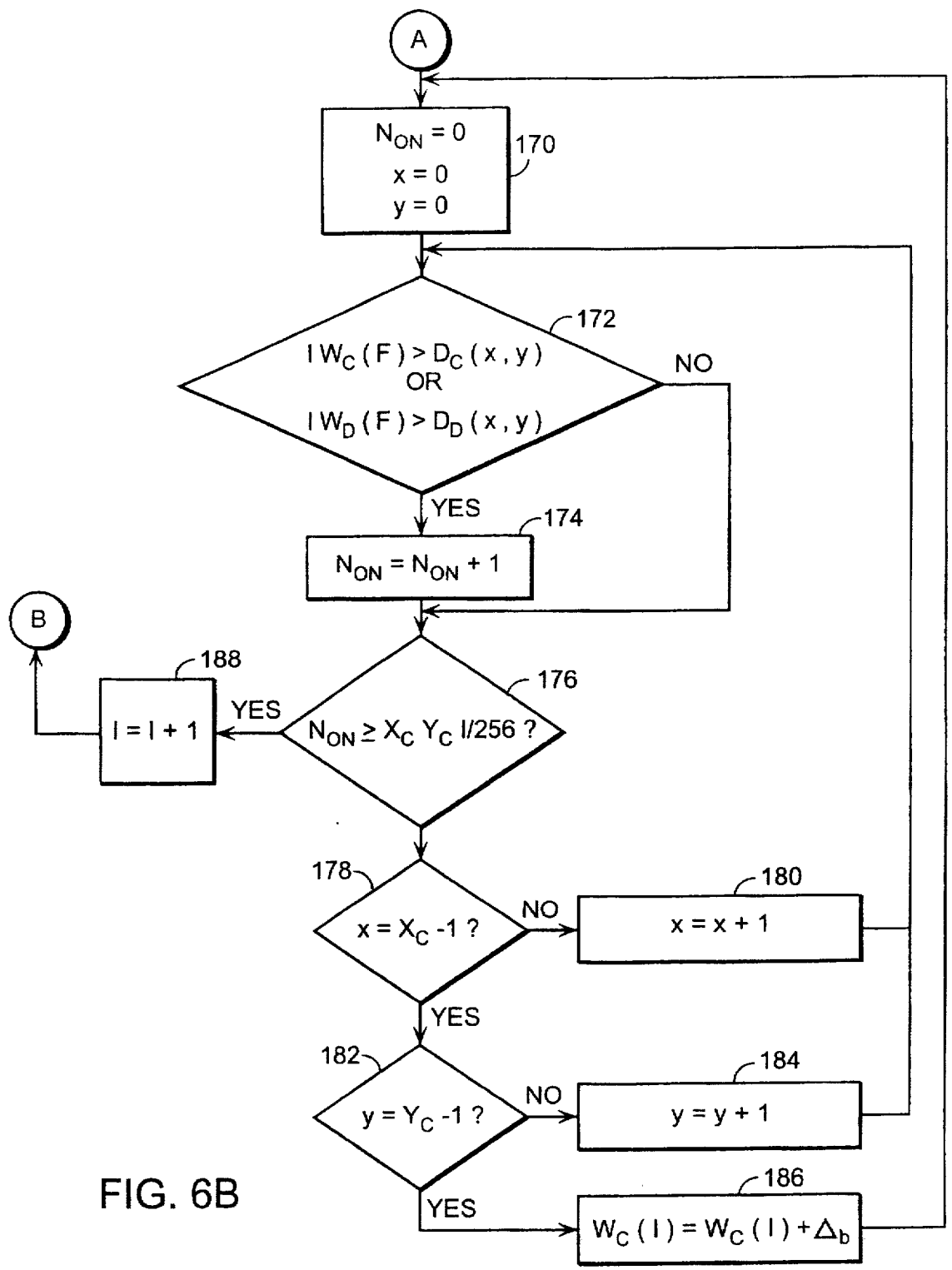

FIGS. 6A and 6B illustrate one way of arriving at a function $W_C(I)$ that compensates for this effect. As FIG. 6A's block 150 indicates, the routine starts with the lowest possible I value, I=0. Then, so long as I is less than 70% of the ink-duty-cycle limit L, the distributed-dot weighting function $W_D$ is set to zero and the clustered-dot weighting function $W_C$ is set to one, as blocks 152, 154, and 156 indicate. And if the pixel value I exceeds the limit L, the weighting values are just the reverse, as blocks 158 and 160 indicate. Blocks 162 and 164 show that the routine assigns values to the weighting functions only up to values of I equal to L; FIG. 3's correction process 42 prevents the occurrence of any values that exceed L.

If the pixel value I is between 70% and 100% of the duty-cycle limit L, the distributed-dot weighting function $W_D$ is assigned a value on the ascending part of FIG. 5's piecewise-linear curve, as FIG. 6A's block 166 indicates. Then, as block 168 indicates, $W_C(I)$ is initially given a value equal to the complement of $W_D(I)$. With these initial values, the process proceeds to the segment depicted in FIG. 6B, in which it counts the number of dots that would be turned on in the area conceptually overlaid by one instance of the cluster-dot dither matrix if that region's value were uniformly the value of I for which $W_C(I)$ is currently being determined.

Specifically, the number $N_{ON}$ of turned-on pixels is initially set to zero, and the position within the matrix-overlaid region is initialized at $(x,y)=(0,0)$. Block 170 represents these steps. Since I is expressed in eight-bit resolution, it has 256 possible values. So if the size of the clustered-dot dither matrix is $X_C \times Y_C$, the number of pixels turned on as a function of I should increase by $X_C Y_C/256$ for each increment in the value of I. If the result of applying either weight to that I value exceeds location (x,y)'s element of the corresponding dither matrix, the number $N_{ON}$ of turned-on pixels is incremented, and $N_{ON}$ is compared with the number of pixels that the currently considered intensity value I should cause to be turned on, as blocks 172, 174, and 176 indicate. If the requisite number of turned-on pixels has not yet been reached, the process is repeated for the next pixel in the region. This continues until the end of the matrix-overlaid region is reached, as indicated by $(x,y)=(X_C-1, Y_C-1)$. Blocks 178, 180, 182, and 184 illustrate this process.

If the entire region has been scanned and the counted number $N_{ON}$ of turned-on dots has not reached the required number, we increase the value of the clustered-dot weighting function $W_C(I)$ by a single-bit increment $\Delta_b$, as block 186 indicates. We then scan the matrix-overlaid region again to determine whether the increased weighting value has caused the number $N_{ON}$ of turned-on dots to reach the required level. If so, as indicated by a positive outcome of test 176, the value of I is incremented, as block 188 indicates, and the process is repeated to find $W_C(I)$ for the new I value.

In this way, the process insures that combining the results of the two dither operations achieves the same duty cycle as the conventional clustered-dot-dithering process on which it is based.

By applying the teachings of the present invention, the principal advantages of clustered-dot dithering can be maintained while avoiding the susceptibility to flecked dark areas with which its use had heretofore been afflicted. The invention therefore constitutes a significant advance in the art.

What is claimed is:

1. A method of operating an image-rendering mechanism to render a source image consisting of an array of pixels, each of whose values consists of at least one relatively fine-resolution component value, the method comprising the steps of:
   A) for component values that do not exceed a predetermined minimum:
      i) applying the component value to a first, clustered-dot-dither-type half-toning process, which yields an indication of whether to apply an imaging agent at a pixel associated with the component value applied thereto; and
      ii) sending instruction signals to the image-rendering mechanism that specify application of an imaging agent in accordance with that indication; and
   B) for at least a range of component values that exceed a predetermined minimum:
      i) applying to the first half-toning process a first weighted value, which results from weighting the component value with a first weighting function of the component value, the first weighted value being a decreasing function of the component value within the range of component values;
      ii) applying to a second, non-clustered-dot-dither-type half-toning process, which yields an indication of whether to apply an imaging agent at a pixel associated with the component value applied thereto, a second weighted value, which results from weighting the component value with a second weighting function of the component value, the second weighted value being an increasing function of the component value within the range of component values; and
      iii) sending the image-rending mechanism instruction signals that specify application of an imaging agent to any pixel to which either half-toning process indicates that the imaging agent should be applied.

2. A method as defined in claim 1 wherein the first and second weighting functions are such that the resultant imaging-agent duty cycle for each component value is the same as the result of applying the imaging agent in accordance with the indication produced by the first half-toning process in response to application of that input component value thereto.

3. A method as defined in claim 2 wherein the second half-toning process is a dispersed-dot-dither-type half-toning process.

4. A method as defined in claim 1 wherein the second weighting function is a linear function of the input component value.

5. A method as defined in claim 4 wherein the second half-toning process is a dispersed-dot-dither-type half-toning process.

6. A method as defined in claim 4 wherein the second weighting function of the predetermined minimum is zero.

7. A method as defined in claim 6 wherein, for at least one input component value, the first weighting function is zero and the second weighting function is unity.

8. A method as defined in claim 1 wherein the second half-toning process is a dispersed-dot-dither-type half-toning process.

9. For operating an image-rendering mechanism to render a source image, an apparatus comprising:
   A) image-revision circuitry responsive to electrical source-image signals representing the source image for performing a sequence of at least one image-revision step, in which sequence each image-revision step receives an input image consisting of input pixels, each of which consists of at least one input component value, and produces therefrom an output image consisting of output pixels, each of which consists of at least one output component value, the input image of the first image-revision step is the source image, the input image of any subsequent image-revision step is the output image of the preceding image-revision step, one said image-revision step is a half-toning operation whose output image consists of an output component value associated with each input component value in the half-toning operation's input image and indicating whether to apply an imaging agent to a medium at a location thereon that corresponds to the pixel that includes that output component, and the halftoning operation includes:
      i) for input component values that do not exceed a predetermined minimum:
         a) applying the input component value to a first, clustered-dot-dither-type half-toning process, which yields an indication of whether to apply an imaging agent at a pixel associated with the input component value applied thereto; and
         b) producing that indication as the output component value associated with that input component value; and
      ii) for at least a range of input component values that exceed a predetermined minimum:
         a) applying to the first half-toning process a first weighted value, which results from weighting the component value with a first weighting function of the input component value, the first weighted value being a decreasing function of the input component value within the range of component values;
         b) applying to a second, non-clustered-dot-dithertype half-toning process, which yields an indication of whether to apply an imaging agent at a pixel associated with the component value applied thereto, a second weighted value, which results from weighting the component value with a second weighting function of the input component value, the second weighted value being an increasing function of the input component value within the range of component values and c) if either half-toning process indicates that the imaging agent should be applied, producing as the associated output component associated with that input component an indication that the imaging agent should be applied; and B) output circuitry responsive to the image-revision circuitry for applying to the image-rendering mechanism electrical command signals specifying application of the imaging agent in accordance with the halftoning operation's output image.

10. An apparatus as defined in claim 9 wherein the first and second weighting functions are such that the resultant imaging-agent duty cycle for each component value is the same as the result of applying the imaging agent in accordance with the indication produced by the first half-toning process in response to application of that input component value thereto.

11. An apparatus as defined in claim 10 wherein the second half-toning process is a dispersed-dot-dither-type half-toning process.

12. An apparatus as defined in claim 9 wherein the second weighting function is a linear function of the input component value.

13. An apparatus as defined in claim 12 wherein the second half-toning process is a dispersed-dot-dither-type half-toning process.

14. An apparatus as defined in claim 13 wherein the second weighting function of the predetermined minimum is zero.

15. An apparatus as defined in claim 14 wherein, for at least one input component value, the first weighting function is zero and the second weighting function is unity.

16. An apparatus as defined in claim 9 wherein the second half-toning process is a dispersed-dot-dither-type half-toning process.

17. An imaging apparatus comprising:
A) an image-rendering mechanism for responding to electrical command signals by rendering a source image;
B) image-revision circuitry responsive to electrical source-image signals representing the source image for performing electrical command signals that a sequence of at least one image-revision step, in which sequence each image-revision step receives an input image consisting of input pixels, each of which consists of at least one input component value, and produces therefrom an output image consisting of output pixels, each of which consists of at least one output component value, the input image of the first image-revision step is the source image, the input image of any subsequent image-revision step is the output image of the preceding image-revision step, one said image-revision step is a half-toning operation whose output image consists of an output component value associated with each input component value in the half-toning operation's input image and indicating whether to apply an imaging agent to a medium at a location thereon that corresponds to the pixel that includes that output component, and the half-toning operation includes:
i) for input component values that do not exceed a predetermined minimum:
a) applying the input component value to a first, clustered-dot-dither-type half-toning process, which yields an indication of whether to apply an imaging agent at a pixel associated with the input component value applied thereto; and
b) producing that indication as the output component value associated with that input component value; and ii) for at least a range of input component values that exceed a predetermined minimum:
a) applying to the first half-toning process a first weighted value, which results from weighting the component value with a first weighting function of the input component value, the first weighted value being a decreasing function of the input component value within the range of component values;
b) applying to a second, non-clustered-dot-dither-type half-toning process, which yields an indication of whether to apply an imaging agent at a pixel associated with the component value applied thereto, a second weighted value, which results from weighting the component value with a second weighting function of the input component value, the second weighted value being an increasing function of the input component value within the range of component values; and
c) if either half-toning process indicates that the imaging agent should be applied, producing as the associated output component associated with that input component an indication that the imaging agent should be applied; and C) output circuitry responsive to the image-revision circuitry for applying to the image-rendering mechanism electrical command signals specifying application of the imaging agent in accordance with the half-toning operation's output image.

18. An imaging apparatus as defined in claim 17 wherein the first and second weighting functions are such that the resultant imaging-agent duty cycle for each component value is the same as the result of applying the imaging agent in accordance with the indication produced by the first half-toning process in response to application of that input component value thereto.

19. An imaging apparatus as defined in claim 18 wherein the second half-toning process is a dispersed-dot-dither-type half-toning process.

20. An imaging apparatus as defined in claim 17 wherein the second weighting function is a linear function of the input component value.

21. An imaging apparatus as defined in claim 20 wherein the second half-toning process is a dispersed-dot-dither-type half-toning process.

22. An imaging apparatus as defined in claim 20 wherein the second weighting function of the predetermined minimum is zero.

23. An imaging apparatus as defined in claim 22 wherein, for at least one input component value, the first weighting function is zero and the second weighting function is unity.

24. An imaging apparatus as defined in claim 17 wherein the second half-toning process is a dispersed-dot-dither-type half-toning process.

25. A storage medium containing instructions readable by a computer to configure the computer to function as a driver for operating an image-rendering mechanism to render a source image, the driver comprising:
A) image-revision circuitry responsive to electrical source-image signals representing the source image for performing a sequence of at least one image-revision step, in which sequence each image-revision step receives an input image consisting of input pixels, each of which consists of at least one input component value, and produces therefrom an output image consisting of output pixels, each of which consists of at least one output component value, the input image of the first image-revision step is the source image, the input image of any subsequent image-revision step is the output image of the preceding image-revision step, one said image-revision step is a half-toning operation whose output image consists of an output component value associated with each input component value in the half-toning operation's input image and indicating whether to apply an imaging agent to a medium at a location thereon that corresponds to the pixel that includes that output component, and the halftoning operation includes:

i) for input component values that do not exceed a predetermined minimum:
   a) applying the input component value to a first, clustered-dot-dither-type half-toning process, which yields an indication of whether to apply an imaging agent at a pixel associated with the input component value applied thereto; and
   b) producing that indication as the output component value associated with that input component value; and ii) for at least a range of input component values that exceed a predetermined minimum:
   a) applying to the first half-toning process a first weighted value, which results from weighting the component value with a first weighting function of the input component value, the first weighted value being a decreasing function of the input component value within the range of component values;
   b) applying to a second, non-clustered-dot-dither-type half-toning process, which yields an indication of whether to apply an imaging agent at a pixel associated with the component value applied thereto, a second weighted value, which results from weighting the component value with a second weighting function of the input component value, the second weighted value being an increasing function of the input component value within the range of component values; and
   c) if either half-toning process indicates that the imaging agent should be applied, producing as the associated output component associated with that input component an indication that the imaging agent should be applied; and B) output circuitry responsive to the image-revision circuitry for applying to the image-rendering mechanism electrical command signals specifying application of the imaging agent in accordance with the half-toning operation's output image.

26. A storage medium as defined in claim 25 wherein the first and second weighting functions are such that the resultant imaging-agent duty cycle for each component value is the same as the result of applying the imaging agent in accordance with the indication produced by the first half-toning process in response to application of that input component value thereto.

27. A storage medium as defined in claim 26 wherein the second half-toning process is a dispersed-dot-dither-type half-toning process.

28. A storage medium as defined in claim 25 wherein the second weighting function is a linear function of the input component value.

29. A storage medium as defined in claim 28 wherein the second half-toning process is a dispersed-dot-dither-type half-toning process.

30. A storage medium as defined in claim 28 wherein the second weighting function of the predetermined minimum is zero.

31. A storage medium as defined in claim 30 wherein, for at least one input component value, the first weighting function is zero and the second weighting function is unity.

32. A storage medium as defined in claim 25 wherein the second half-toning process is a dispersed-dot-dither-type half-toning process.

* * * * *

UNITED STATES PATENT AND TRADEMARK OFFICE
CERTIFICATE OF CORRECTION

PATENT NO. : 5,802,212
DATED : September 1, 1998
INVENTOR(S) : Shu et al.

It is certified that error appears in the above-identified patent and that said Letters Patent is hereby corrected as shown below:

Title page, insert the following item:
[60] Provisional application No. 60/011,437, filed Feb. 9, 1996.--

Column 1, line 4, insert the following:
--CROSS REFERENCE TO RELATED APPLICATION
Reference is made to the priority claimed from U.S. provisional application Ser. No. 60/011,437, filed Feb. 9, 1996, entitled CLUSTERED-DOT DITHER WITH WHITE-FLECK SUPPRESSION--.

Signed and Sealed this

Twenty-third Day of March, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO.      : 5,802,212
DATED           : September 01, 1998
INVENTOR(S)     : Joseph Shu, et al.

It is certified that errors appear in the above identified patent and that said Letters Patent is hereby corrected as shown below:

Column 8, line 59, change "dithertype" to --dither-type--.

Signed and Sealed this

Sixth Day of April, 1999

Q. TODD DICKINSON

*Attest:*

*Attesting Officer*        Acting Commissioner of Patents and Trademarks